INVENTOR
Burton H. Locke

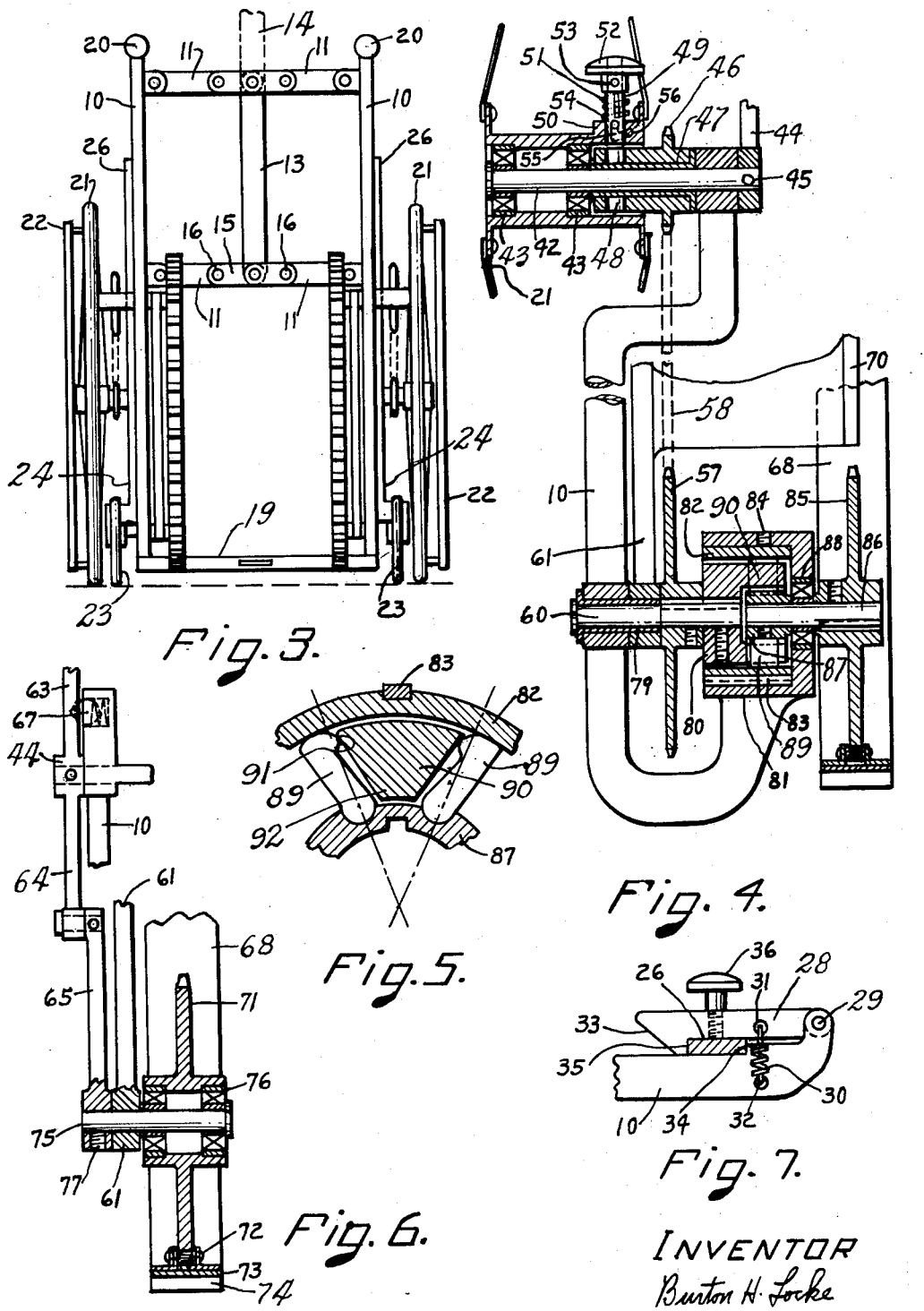

United States Patent Office 3,146,841
Patented Sept. 1, 1964

3,146,841
STAIR-CLIMBING WHEEL CHAIRS
Burton H. Locke, Framingham, Mass.
(4546 Willowcrest Ave., North Hollywood, Calif.)
Filed Feb. 25, 1963, Ser. No. 260,453
5 Claims. (Cl. 180—5.22)

This invention relates to improvements in self-propelled and controlled wheel chairs, or vehicles, for use of invalids the propelling and maneuvering of which is accomplished by the occupant of the vehicle, and which is adaptable to travel along a plane surface and also over obstructions, such as stairs and curbs, etc.

The main object of this invention is to provide improvements in my prior application filed March 5, 1962, Serial No. 177,329, now Patent No. 3,111,331, in that a means is provided whereby the swinging of the swivel wheels, necessary to accomplish stair climbing, can be manipulated and controlled by the occupant of the vehicle and also to incorporate an improved mechanism whereby the movement of the traction belts will be automatically controlled in both directions by the rotation of the drive wheels and thus eliminate individual control requirement thereof by the occupant.

As set forth in said prior application, an object of the invention is to provide a wheel chair, or vehicle, that can be operated on a plane surface like a conventional wheel chair in that it has two main drive wheels and two maneuverable swivel wheels and a chair with back and foot rest and handles at the rear for the use of an attendant, when required, and to further provide a simple and easily maneuverable structure which the occupant can readily put into service to override obstructions, such as stairs, or curbs, etc.

Another object is to provide a structure wherein the chair remains substantially upright when the vehicle is traveling up a stair, for example, as well as on level surfaces. This is accomplished by providing a stair climbing structure that can be pivoted in substantial parallelism with the stairs while the chair remains substantially upright.

Another object is to provide a structure that can be driven up, or down, a flight of stairs, as the case may be, and turned in a small space such as encountered on L or U type landings and then driven over the next flight of stairs without requirement of changing gear during the interchange thus minimizing operational requirement of the occupant.

To accomplish these objects, I conceive a plurality of belt traction devices that can be swung into service by the occupant for use during the stair climbing operation, that is driving up a flight of stairs and over a landing and then up the next flight without further manipulation.

Another objective is to provide a simple means that will automatically check the movement of the vehicle in either direction when operating on the traction belts for reason of safety and to facilitate manipulation of the vehicle.

Another object is to provide a vehicle that can be collapsed, or reduced in size, to permit transporting in the trunk of an automobile.

Another object is to provide a chair that is relatively light in weight for ease in transporting and maneuvering, etc.

Other objectives are simplicity of construction by confining to a minimum number of parts and to minimize the number of operational requirements to simplify operation and to provide a vehicle that can be offered at a reasonable cost so as not to limit its users.

In the accompanying drawing:

FIGURE 3 is a rear elevation of that shown in FIGURE 1.

FIGURE 4 is an enlarged section taken on line 4—4 of FIGURE 1.

FIGURE 5 is an enlarged fragmental section taken at the drive end of the traction device to show the automatic locking mechanism for the belt.

FIGURE 6 is a fragmental elevation showing the traction device shifting mechanism with the traction device shown in section.

FIGURE 7 is a fragmental plan view to show the automatic latching means to retain the swivel wheels in their normal down position.

Figure 1:
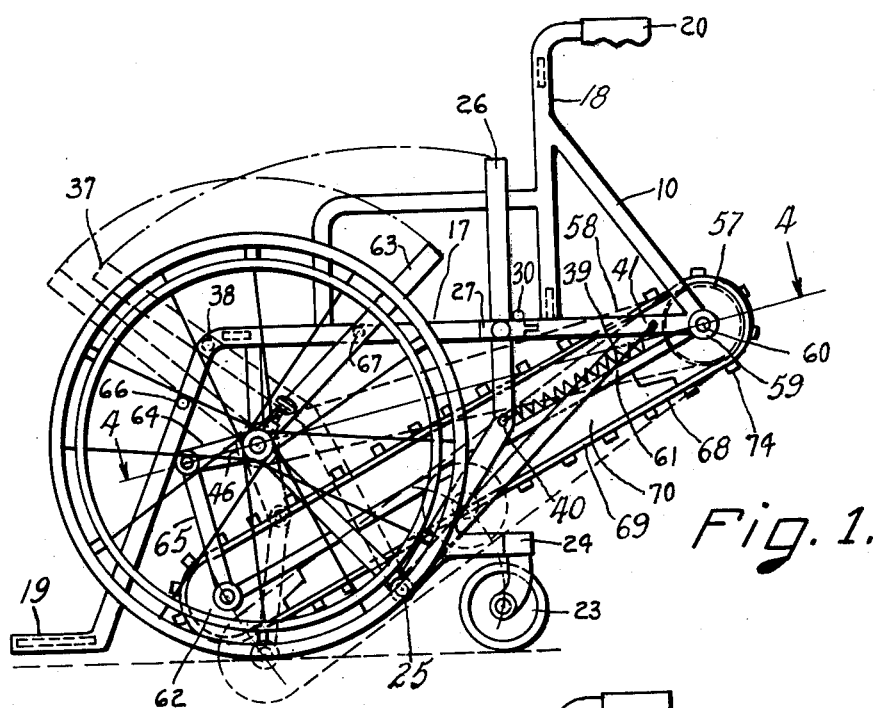
FIGURE 1 is a side elevation of my chair in condition to travel on plane surfaces in the form of a conventional wheel chair.

My improved wheel chair comprises light weight rigid side frames 10 held in spaced parallelism by a plurality of light weight collapsible bar members 11. As shown in FIGURE 3, the bars are pivotally attached to the side frames and to a center bar 13 and when bar 13 is raised as shown by dotted lines 14 the side frames 10 will move toward each other and thus reduce the overall width of the vehicle for transporting in a trunk of an automobile.

Simple means, such as a latch plate 15 which is attached to two adjacent bars 11, as at 16, could be employed to retain the side frames in spaced position when the chair is being used. Obviously, other collapsible structure could be employed to serve in place of that shown.

Referring to FIGURE 1, each frame 10 has a portion 17 with lateral bar members such as 11 forming a collapsible chair seat and a portion 18 with similar lateral members to form a collapsible back for the chair. A foot rest 19 is integral with the side frames, or pivotally attached thereto as the case may warrant, and a handle portion 20 which could be used by an attendant in manipulating the vehicle is provided at the rear of each side frame. Seat and back pads which are provided for the chair are not shown for reason of clarity.

A conventional large rubber tired wheel 21 having a conventional hand rim portion 22 is rotatively mounted to each side frame 10 and a conventional smaller swivel wheel 23 is mounted on a bell crank lever 24. Lever 24 is pivotly attached to frame 10 at 25 and has an upwardly extended portion 26 suitably positioned for manipulation by the occupant of the vehicle. Each swivel wheel 23 is held in down position, as shown in FIGURE 1, to contact plane surfaces by portion 26 of the lever being retained in a latching device 27, shown by FIGURE 7, attached to each side frame 10, respectively. Each latching device comprises a latch bar 28 pivoted to side frame 10 at 29 and held in resilient engagement therewith by an extension spring 30 attached to bar 28 at 31 and to frame 10 at 32. The forward end 33 of bar 28 is inclined so the lever portion 26 when moving back to normal position will cam the bar 28 outward and thereby be permitted to pass to the position shown whereat it abuts a projection 34 provided on frame 10. The overlapping surface 35 of the bar is square with sides of the lever 26 so that when the bar 28 springs back to position shown it will retain the lever. A knob 36 is secured to bar 28 for the occupant of the vehicle to grasp to swing the bar outward to release the lever 26.

Figure 2:
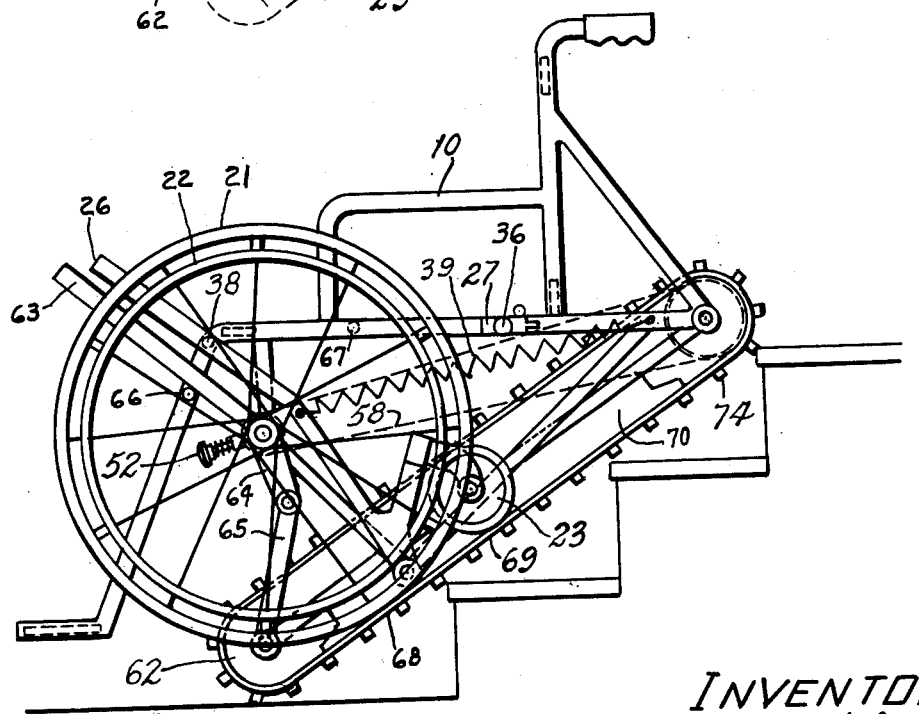
FIGURE 2 is a side elevation of the same when in condition to travel on stairs, for example.

When the vehicle is operating on plane surfaces each swivel wheel is positively held in its down position, as shown in FIGURE 1, by means of the latching device just described. When the vehicle is operating over obstructions each swivel wheel is in its upper position, as shown in FIG. 2, and is so positioned and retained thereat by the occupant moving the respective lever 26 to position shown by dotted lines 37, FIGURE 1, whereat the lever is retained by a spring actuated ball plunger 38 engaging a suitable detent provided in the lever, in the same manner as a ball plunger 67, shown in FIGURE 6, and to be referred to hereinafter.

An extension spring 39 is attached to each lever portion 26 at 40 and to frame 10 at 41 and is for the purpose of urging the respective swivel wheel 23 downward to its normal position when lever portion 26 is released from the ball plunger 38, by the occupant of the vehicle.

Referring to FIGURE 4, which shows structure common to both sides of the vehicle, the wheel 21, shown fragmentally, is rotatively mounted on a shaft 42 by means of bearings 43. Shaft 41 is retained in the side frame 10 by means of a bell crank lever 44, to be set forth hereinafter, which is secured to shaft 27 by a pin 45. A sprocket 46 having a bearing bushing 47 is rotatively mounted on shaft 41 and has a hub portion extending part way into wheel 21. There are a plurality of apertures 48 spaced around said hub portion either of which can receive a plunger 49 slidably mounted in a boss portion 50 on wheel 21. Plunger 49 is resiliently held out of contact with apertures 48 by a compression spring 51 intermediate a knob 52, secured to plunger 49 by a pin 53, and boss 50. Said knob is accessible between the spokes of the wheel 21.

Plunger 49 is retained in boss 50 by a pin 54 pressed into the plunger and being free in a slot 55 in boss 50. When plunger 49 is manipulated into an aperture 48 and rotated, the pin 54 is moved to position 56. The end portion of the slot is inclined to retain the pin and thus the plunger within the aperture and cause the sprocket 45 to become clutched to the wheel 21. In other words, pin 54 and slot 55 cooperate to form a so-called bayonet lock.

Sprocket 46 is disposed to drive a sprocket 57 on a belt traction device, to be explained hereinafter, by means of a chain 58 when the plunger is engaged in an aperture. When the plunger is out of engagement, the sprocket and chain will remain at rest when the wheel 21 is rotated. Obviously, the plunger would be engaged by the occupant only when the traction device is required for over-riding an obstruction.

Referring to FIGURES 1 and 2, each belt traction device is pivotly mounted on a side frame 10 at 59 by a shaft 60 disposed in frame 10 by means to be set forth hereinafter, and each device comprises a frame 61 which supports a drive sprocket unit at 59 and an idler sprocket unit at 62. The pivoting of frame 61 will bring idler unit 62 down below the wheels 21, as shown in FIGURE 2, and is accomplished by toggle linkage, note FIGURE 6, which comprises the bell crank lever 44 having an upwardly extended portion 63 disposed for manipulation by the occupant to swing the lower forward portion 64 of the lever downward and thereby swing a connecting link 65, which is pivoted to the portion 64 and to unit 62, past the centerline between the pivot center of the lever and unit 62. The handle portion 63 of lever 44 then abuts a pin 66 secured in frame 10. The pin 66 functions to retain unit 62 in its down position for reason of the past center position of the linkage.

When the unit 62 is raised to its upper position, as shown in FIGURE 1, the lever 44 is held by a resiliently mounted ball 67 positioned in frame 10 and engaging a detent provided in lever portion 63, note FIGURE 6.

A belt 68, to be described hereinafter, operates over units 59 and 62 and effects a straight line surface 69 inclined with wheels 21 for the purpose of contacting stairs, as shown in FIGURE 2, when the unit 62 is lowered by lever 63. The lowering of the units 62 will raise the vehicle and position the wheels 21 out of contact with the surface on which they normally operate. A rigid track 70 which is integral with frame 61 is disposed to abut the back of the belt along surface 69 to afford a firm surface to contact the ends of the treads on stairs, as shown in FIGURE 2, and thereby effect maximum traction therewith.

As shown in FIGURE 1, the traction belt units are up under the seat of the vehicle and out of contact when the vehicle operates on its wheels over plane surfaces, as a conventional wheel chair.

Referring to FIGURE 6, which shows structure common to both sides of the vehicle, the traction belt idler unit 62 comprises a sprocket 71 supporting a conventional steel roller chain 72 of the bent side plate attachment type. Generally, a rubber pad, or shoe 73, is vulcanized on the bent over side plates of each link of the chain and generally every other shoe has a protruding lug portion 74 to effect adequate traction with the ends of the stair treads. The sprocket 71 is rotatively mounted on a stud 75 by bearings 76. The stud 75 is free in frame 61 and is secured in connecting link 65 by a set screw 77.

Referring to FIGURES 4 and 5, which show structure common to both sides of the vehicle, the traction belt drive sprocket 57, which is driven by chain 58 from sprocket 46 on drive wheel 21, is keyed and set screwed to a drive shaft 60 rotatively mounted in bushing 79 extending through frames 10 and 61. Drive shaft 60 extends into and is keyed to the drive element 80 of a commercial "Formsprag" REV-LOK dual locking and positioning device which is mounted in an extended portion 81 of frame 10 by the outer stationary race 82 of the device being held against rotation in extended portion 81 by a key 83 and a set screw 84.

A sprocket 85 is keyed and set screwed to a driven shaft 86 which extends into and is keyed and set screwed to the driven element 87 of the REV-LOK device. A bearing 88 is provided to assist in supporting the shaft 86. As shown, the sprocket 85 supports the traction belt 68.

The function of the Formsprag REV-LOK device can best be explained by reference to FIGURE 5. The driven element 87 of the device cannot be self rotated in either direction due to wedging elements 89, known as sprags, which are set in pairs in and around the periphery of the driven element, wedging against the stationary outer race 82. However, the drive element 80, which has lugs 90 extending between each pair of sprags, can rotate the driven shaft in either direction by reason that the outer portion 91 of the lug 90 first contacts the outer end of the sprag and unwedges it and then the inner portion 92 of the lug drives the driven element by contacting the base of the sprag.

Therefore, it is obvious that the vehicle can be driven in either direction, i.e. up or down a stairs on the traction belts by respective rotation of the drive wheels. However, the traction belts cannot move unless driven by the drive wheels and therefore the vehicle will not inadvertently move down the stairs when ascending or descending. In other words the adaption of the REV-LOK device in the manner set forth affords a self-locking brake and its operation being automatic eliminates any manipulation requirement of the occupant. Therefore, the adaption of the mechanism is an improvement over the antiback-lash mechanism set forth in my prior application. This is one of the main objects of this invention.

The vehicle can be turned in as small an area when operating on the lower end of the traction belts and the swivel wheels as when operating on the drive wheels and swivel wheels because the belts are individually driven from a drive wheel and thus one belt can be driven in reverse while the other is driven forward, if required.

The vehicle is easily maneuverable as a conventional wheel chair for reason the traction belts are out of contact and not driven.

To climb stairs, the drives to the traction belts are first engaged and then the vehicle is backed closed to the stairs. Next the traction devices are lowered into contact thereby raising the drive wheels out of contact by tipping the vehicle backward which moves the center of gravity rearward. The swivel wheels are then raised causing the traction belts to contact the stairs. The vehicle is then driven up the stairs by the occupant pulling backward on the drive wheels. When nearing the top of the stairs, the occupant moves the levers 26 from the ball plungers which releases the swivel wheels and the springs 39 with the aid of gravity act to lower the wheels onto the floor above while the levers 26 enter the latches 27 and the wheels become locked down in normal position as the traction belts are passing over the top step. Thus the swivel wheels become latched in normal down position automatically eliminating manipulation requirement. The vehicle can then be maneuvered on the lower end of the traction belts and the swivel wheels around on a landing or on an upper floor, as the case may be.

In descending, the drives are engaged and the traction devices lowered. Then the vehicle is driven slowly forward and over the top step on the lower end of the belts and the swivel wheels. When the belts have moved down to contact the next to the top step the swivel wheels are raised by the occupant and the vehicle is driven down the stairs by the occupant pushing forward on the drive wheels. Note, the vehicle can only be moved by the occupant rotating the drive wheels due to the REV-LOK device. Therefore, the vehicle is safely under control of the occupant at all times when being moved on the belts.

When nearing the bottom of the stairs, the occupant releases the swivel wheels and they automatically move downward into normal position and the vehicle then rests on the lower end of the belts and the swivel wheels until the traction devices are raised in converting the vehicle back to conventional wheel chair form.

The center of gravity of the vehicle when occupied is well back of the drive wheels and thus will not inadvertently tip downward when on stairs because the lower end of the traction belts extend down at least to the center of the drive wheels.

The ratio of the drive from the drive wheels to the traction belts is such as to require only a minimum of pull on the drive wheels by the occupant to drive the vehicle up a stair. In descending, gravity will act to assist the occupant in rotating the drive wheels to drive the vehicle down.

I do not wish to be confined to the exact details set forth as the same are susceptible of modification within the spirit or scope of the invention set forth. For example, if desired rigid structure instead of collapsible structure could be employed to sustain the side frames in spaced relationship.

I claim:

1. An occupant propelled and controlled obstruction-climbing wheel chair comprising a pair of side frames sustained in spaced relationship by lateral structure, said structure forming a chair comprising a seat, a back and a foot rest, a drive wheel rotatively mounted in fixed position on each side frame at the front or foot rest end of said chair, a swivel wheel positioned to the rear of each drive wheel and pivotly mounted to the respective side frame, each swivel being disposed to be pivoted out of normal position to facilitate obstruction climbing, means disposed to be operated by the occupant of the chair to effect and control the pivoting of the swivel wheels, a traction belt device comprising a frame carrying a plurality of rotatable members in spaced relationship with an endless belt operating thereover pivotly mounted in fixed position in each side frame by a lateral extension of the rear rotatable member extending into the frame structure at the rear thereof, each traction device frame structure extending under said chair and the foward end of each being connected to operating means attached to each side frame, respectively, said means being disposed to be operated by the occupant of the chair to raise the forward end of the respective traction device out of contact with surfaces on which the said wheels would normally operate and to lower the said end of the devices to contact said surfaces and thereby effect raising the front of the chair to raise the drive wheels out of contact with surfaces as set forth, independent drive means connecting each drive wheel with each traction device, respectively, means to engage and disengage each said drive means, means to check the movement of each traction belt in both directions whenever the respective drive wheel is at rest, said means being such as to effect movement of the belts in accordance with any rotation of the respective drive wheels that may be effected by the occupant of the chair.

2. A wheel chair as described in claim 1, with the said lateral structure being collapsible to permit reducing the overall width of the chair for reasons set forth.

3. A wheel chair as described in claim 1, with resilient means disposed to urge said swivel wheels to their normal position.

4. A wheel chair as described in claim 1, with means to abut the back surface of the portion of each traction belt disposed to contact obstructions.

5. An occupant propelled and controlled obstruction-climbing wheel chair comprising a pair of side frames sustained in spaced relationship by lateral structure forming a chair comprising a seat, a back and a foot rest, a drive wheel rotatively mounted in fixed position on each side frame at the front or foot rest end of said chair, a swivel wheel positioned at the rear of each drive wheel and pivotly mounted to the respective side frame, each swivel wheel being disposed to be pivoted out of normal position to facilitate obstruction climbing, means disposed to be operated by the occupant of the chair to effect and control the pivoting of the swivel wheels, a traction belt device comprising a frame carrying a plurality of rotatable members in spaced relationship with an endless belt operating thereover mounted in fixed position in each side frame at the rear of said chair and extending under the chair, each said device being inclined substantially relative to conventional stairs, independent drive means connecting each drive wheel with each traction device, respectively, means to engage and disengage each said drive means, means to check the movement of each traction belt in both directions whenever the respective drive wheel is at rest, said means being such as to effect movement of the belts in accordance with any rotation of the respective drive wheel that may be effected by the occupant of the chair.

References Cited in the file of this patent

UNITED STATES PATENTS

| 838,228 | Williams | Dec. 11, 1906 |
| 2,765,860 | Church | Oct. 9, 1956 |
| 3,049,364 | Clay | Aug. 14, 1962 |
| 3,094,195 | Lund | June 18, 1963 |

FOREIGN PATENTS

| 693,983 | Great Britain | July 8, 1953 |

OTHER REFERENCES

Pamphlet "Wanted, A Stair-Climbing Wheel Chair," January 1962, National Inventors Council, pages 16–26 only, relating the Lionel Freeman wheelchair.